Jan. 6, 1959    W. F. SKILLIN    2,867,441
POWER CHUCK
Filed Dec. 10, 1956    2 Sheets-Sheet 1
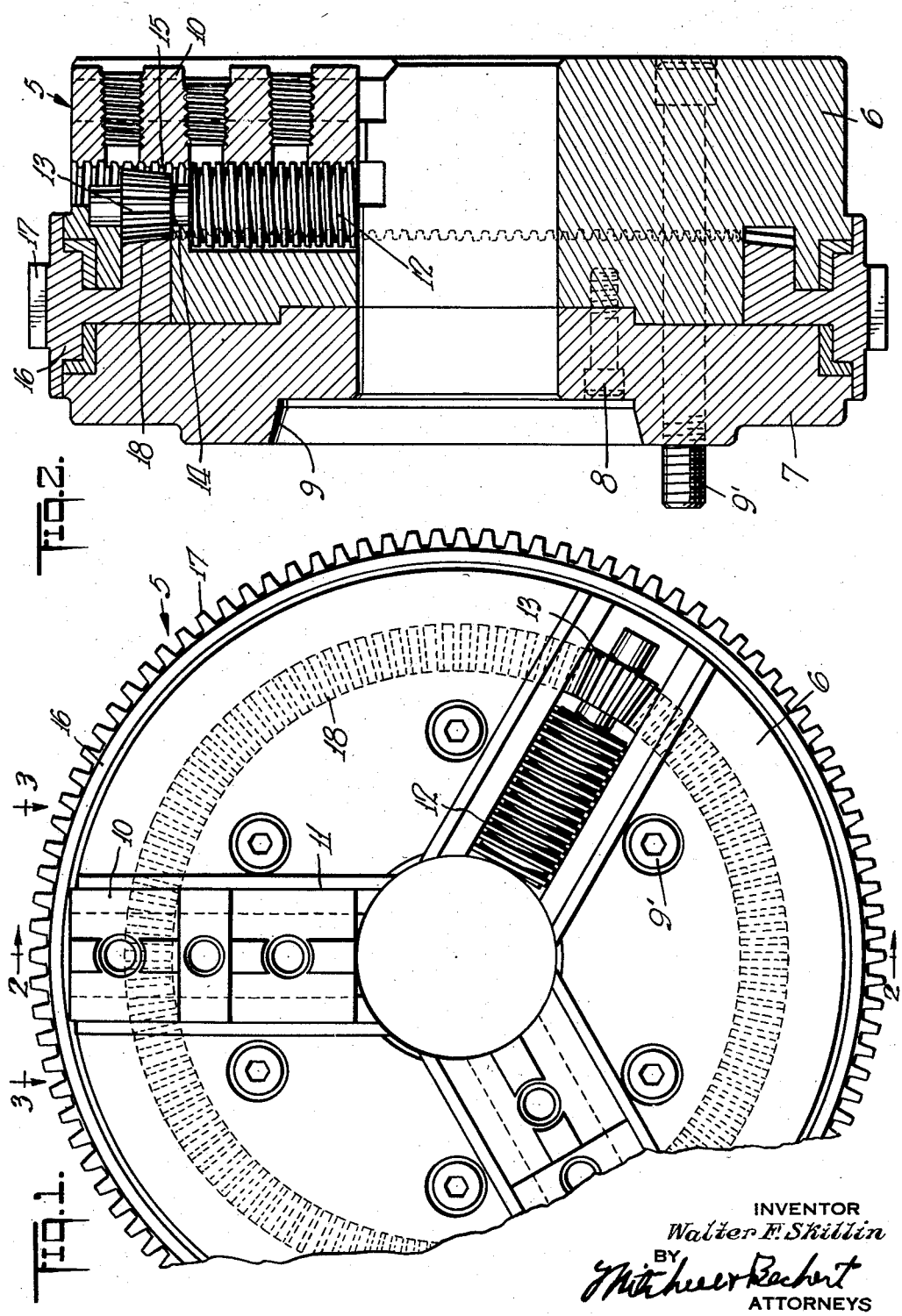
INVENTOR
Walter F. Skillin
BY
ATTORNEYS Jan. 6, 1959 — W. F. SKILLIN — 2,867,441
POWER CHUCK
Filed Dec. 10, 1956 — 2 Sheets-Sheet 2

INVENTOR
Walter F. Skillin
BY
Mitchell Bechert
ATTORNEYS

United States Patent Office 2,867,441
Patented Jan. 6, 1959

2,867,441

POWER CHUCK

Walter F. Skillin, New Britain, Conn., assignor to Union Manufacturing Company, New Britain, Conn., a corporation of Connecticut Application December 10, 1956, Serial No. 627,327

3 Claims. (Cl. 279—112)

My invention relates to a chuck, and more particularly to improved means for operating the jaws thereof.

It is an object of the invention to provide an improved chuck.

It is another object to provide an improved and simplified jaw-actuating mechanism for a chuck.

Another object is to provide a very compact jaw-actuating mechanism for a chuck and which is very simple in construction and easy to assemble.

Other objects and various features of novelty and invention will be hereinafter pointed out or will become apparent to those skilled in the art.

Briefly stated, in a preferred form of the invention, I employ a chuck body having radial chuck jaws. The body of the chuck has an annular ring, preferably a ring gear rotatably mounted on the outside of the chuck and rotatable relatively thereto about the chuck axis. This annular ring may be operated by hand or by power means, such as a power wrench. This annular ring, inside of the chuck body, has a bevel gear for rotating a bevel pinion rotatably mounted within the chuck body. The bevel pinion drives a screw which in turn is arranged for moving the jaw radially. The parts are compactly arranged and the bevel pinion and screw are preferably located directly beneath the chuck jaw, and all of the parts are thus compactly assembled and the parts are readily removable and replaceable when required.

In the drawings, which show for illustrative purposes only, preferred forms of the invention:

Fig. 1 is a front view in elevation of a chuck illustrating features of the invention, parts being removed and parts broken away to illustrate interior construction.

Fig. 2 is a central sectional view, taken substantially in the plane of the line 2—2 of Fig. 1.

Figure 3:
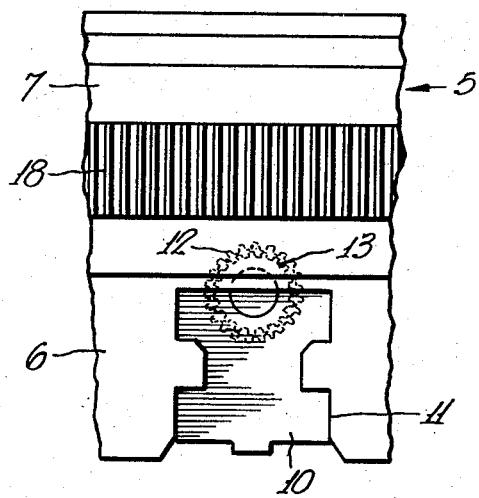
Fig. 3 is a fragmentary radial view, taken substantially on the line 3—3 of Fig. 1.

In the specific form shown, particularly in Figs. 1 to 3, there is a chuck body 5 which may consist of a front body section 6 and a rear plate or body section 7 secured to the front section by suitable screws 8 or other device, as will be understood. The rear section 7 is recessed as indicated at 9 to receive the front end of a spindle to be secured thereto in any desired fashion such as by screws 9'. The chuck carries a plurality of jaws such as the jaws 10 which are slidable radially in ways 11 shown particularly in Fig. 3.

Within the chuck body there is a rotatable screw 12 and a bevel pinion 13 which are mounted for rotation in the chuck body preferably on a radial axis and directly beneath the jaw 10. In the particular form shown, the pinion 13 and screw 12 are unitarily assembled and there is a space between them so that a lip or flange 14 on the chuck body may extend between and position the pinion and screw in an axial direction. The chuck jaw 10 is moved in its ways by means of the screw 12 and in the form illustrated, the inner part of the jaw 10 is provided with semi-circular threads 15 which mesh directly with the threads on the screw 12; thus upon rotation of the screw 12 the jaw 10 will be moved radially.

There is an annular ring 16 mounted on the outside and about the chuck body and arranged for rotation relatively to the body about the axis of the chuck. In the form illustrated in Figs. 1 to 3, this annular ring 16 is in the form of a ring gear provided with teeth 17 which may be engaged by teeth on a power wrench, or the like, for rotating the ring 16 relatively to the chuck body. At the inside of the chuck body there is a bevel gear 18 which, in the form shown, is integral with the annular ring 16 and rotates directly therewith. This bevel gear 18 is in mesh with the bevel pinions 13 so that upon rotation of the annular ring 16 the bevel gear 18 will rotate the bevel pinion 13 which in turn will rotate the screw 12 and through the threads 15 will move the jaws 10 radially.

As illustrated, the bevel pinion 13 and the screw 12 are mounted radially and directly beneath the jaws 10. The parts may be disassembled by first removing the jaws 10 radially and then lifting out the combined screw 12 and bevel pinion 13. The annular ring 16 and its bevel gear 18 may be separated from the housing by separating the housing parts 6–7 on the line as shown, after which the ring gear 16 and its bevel gear may be lifted out from the front housing section 6. It will be seen then that all of the parts are compactly arranged and the jaws and the actuating mechanism arranged close to each other so as to get the best and most direct action on the jaws. Since the bevel gear 18 is annular and since the bevel pinions and screws to go with the jaws are symmetrically arranged all parts will be properly balanced. The jaws may be operated either by hand by rotating the annular ring 16, or by means of a power wrench, as indicated.

Figure 4:
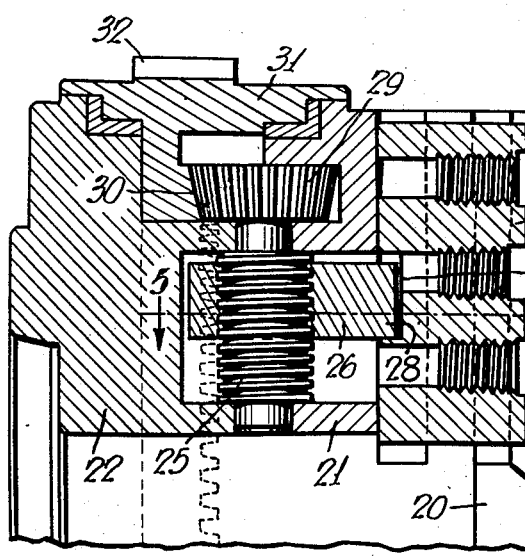
Fig. 4 is a fragmentary view similar to Fig. 2, but illustrating a modification.
Figure 5:
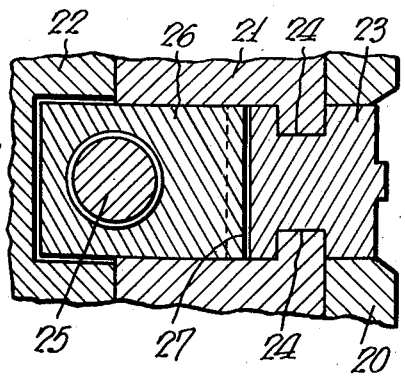

In the form illustrated in Figs. 4 and 5 the principal parts of the chuck body may be substantially the same as those heretofore described. However, in the form shown in Figs. 4 and 5 the body may consist of a front plate 20, an intermediate section 21 and a rear section 22. The later section is arranged for securement to the spindle nose, as has been described. In the form shown in Figs. 4 and 5, the chuck jaws, such as 23 are slidable on ways 24, in the usual fashion.

Within the body of the chuck there is an actuating screw 25 and its bevel pinion 26 both rotatable together, and in the form shown, both mounted on a radial axis. The screw 25 does not coact directly with the jaw 23, as in the other form, but the screw and the jaw 23 are connected by means of what I term a traveler 26 which is guided for movement in a suitable aperture or housing in the chuck body and is threaded like a nut on the screw 25. This traveler 26 is connected to the jaw as by means of a notch 27 in the jaw into which the end 28 of the traveler 26 projects. Thus, when the screw 25 is rotated, the traveler moves radially and carries the jaw 23 with it.

The bevel pinion 29 is actuated by a bevel gear 30 which is carried with the annular ring 31 which may be a ring gear and have teeth 32 for engagement by a power wrench or the like, as heretofore described. Thus, the two forms are substantially alike, except that in the form shown in Figs. 4 and 5, the jaws are actuated as by means of a traveler 28 rather than directly by the screw. The parts in Figs. 4 and 5 may be readily disassembled by loosening the securing screws 33 which hold the intermediate section and the back section together after which all of the parts may be readily disassembled, as will be understood. It will be seen that in both cases the parts are all compactly arranged and are arranged so as to provide a perfect balance of all parts.

While the invention has been described in considerable detail and preferred forms illustrated, it is to be understood that changes may be made within the scope of the invention, as defined in the appended claims.

I claim:

1. In a chuck, a chuck body, a chuck jaw movable thereon, an annular ring mounted on the outside of said chuck body and rotatable relatively thereto on the axis of the chuck body, said annular ring having a bevel gear thereon at the inside of the chuck body, a bevel pinion rotatably mounted in said body and meshing with said bevel gear, a screw coaxial with and movable with said bevel pinion, and means of connection between said jaw and said screw for moving the jaw upon rotation of said screw.

2. In a chuck, a chuck body, a jaw movable thereon, a ring gear mounted on the outside of said chuck body and rotatable relatively thereto on the axis of the chuck body, a bevel gear carried by and movable with said annular ring and located at the inside of said chuck body, a bevel pinion and screw rotatably mounted in said chuck body, said pinion and bevel gear being in mesh with each other, said jaw having a thread thereon meshing with the thread of said screw, whereby upon rotation of said screw said jaw will be moved.

3. In a chuck, a chuck body, a jaw movable thereon, an annular ring mounted on said chuck body and rotatable thereon about the axis of the chuck, said annular ring having a bevel gear thereon at the inside of the chuck body, a bevel pinion and a screw mounted in said chuck body, said pinion being in mesh with said bevel gear, a traveler on said screw and having threads meshing with the threads on said screw, and means of connection between said traveler and said jaw for moving the latter upon rotation of said screw.

References Cited in the file of this patent
UNITED STATES PATENTS

| | | |
|---|---|---|
| 1,713,797 | Whiton | May 21, 1929 |
| 1,814,699 | Hubbell | July 14, 1931 |